US009519827B2

(12) United States Patent  (10) Patent No.: US 9,519,827 B2
Guo et al.  (45) Date of Patent: Dec. 13, 2016

(54) PERSONALIZED, AUTOMATED RECEPTIONIST

(71) Applicant: International Business Machines Corporation, Armonk, NY (US)

(72) Inventors: Shang Q. Guo, Cortland Manor, NY (US); Christopher P. Jones, Las Vegas, NV (US); Jonathan Lenchner, North Salem, NY (US); Nathan Masters, Henderson, NV (US); Daniel A. Mazzella, Henderson, NV (US); James A. Oravec, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 14/582,517

(22) Filed: Dec. 24, 2014

(65) Prior Publication Data

US 2016/0188960 A1    Jun. 30, 2016

(51) Int. Cl.
| | |
|---|---|
| *G06K 9/00* | (2006.01) |
| *G06F 21/62* | (2013.01) |
| *G06K 9/66* | (2006.01) |
| *G06N 5/04* | (2006.01) |
| *G06N 99/00* | (2010.01) |
| *G10L 13/00* | (2006.01) |
| *G10L 15/22* | (2006.01) |
| *G10L 15/26* | (2006.01) |

(52) U.S. Cl.
CPC ....... *G06K 9/00288* (2013.01); *G06F 21/6218* (2013.01); *G06K 9/00228* (2013.01); *G06K 9/66* (2013.01); *G06N 5/04* (2013.01); *G06N 99/005* (2013.01); *G10L 13/00* (2013.01); *G10L 15/22* (2013.01); *G10L 15/26* (2013.01)

(58) Field of Classification Search
CPC .......... G06Q 10/06; G10L 15/26; H04N 7/147
See application file for complete search history.

(56) References Cited

U.S. PATENT DOCUMENTS

| | | | | |
|---|---|---|---|---|
| 6,314,165 | B1 * | 11/2001 | Junqua | .................... G10L 15/26 |
| | | | | 379/216.01 |
| 7,133,070 | B2 * | 11/2006 | Wheeler | .................. H04N 1/40 |
| | | | | 348/223.1 |

(Continued)

*Primary Examiner* — Gregory M Desire
(74) *Attorney, Agent, or Firm* — Ryan, Mason & Lewis, LLP (57) ABSTRACT

Methods, systems, and computer program products for creating a personalized, automated receptionist are provided herein. A method for providing an automated receptionist for a host user includes obtaining one or more images of a work environment of the host user; processing the one or more images to determine if at least one visitor is present in the work environment; and if the at least one visitor is determined to be present in the work environment, notifying the host user that the at least one visitor is present in the work environment, wherein at least one of the steps are performed by at least one hardware device. The method may be initiated, for example, when the host user is not present in the work environment. The automated receptionist can optionally (i) provide a greeting to the at least one visitor; (ii) enable communication between the at least one visitor and the host user; and/or (iii) provide one or more information items to the at least one visitor when the host user is not present.

14 Claims, 4 Drawing Sheets

(56) References Cited

U.S. PATENT DOCUMENTS

| | | | |
|---|---|---|---|
| 8,254,631 B2* | 8/2012 | Bongard | G07B 15/00 348/143 |
| 8,308,304 B2 | 11/2012 | Jung et al. | |
| 8,519,824 B1 | 8/2013 | Rankin et al. | |
| 8,913,103 B1* | 12/2014 | Sargin | G06K 9/00221 348/14.12 |
| 2009/0030800 A1* | 1/2009 | Grois | G06F 17/30864 705/14.52 |
| 2009/0180668 A1* | 7/2009 | Jones | G06F 3/017 382/103 |
| 2009/0189971 A1* | 7/2009 | Yoder | G06Q 10/06 348/14.01 |
| 2011/0153341 A1 | 6/2011 | Diaz-Cortes | |
| 2012/0227007 A1 | 9/2012 | Nicholson et al. | |
| 2013/0098861 A1 | 4/2013 | Mei et al. | |
| 2013/0201359 A1 | 8/2013 | Wu et al. | |
| 2013/0218865 A1 | 8/2013 | Angulo et al. | |

\* cited by examiner

PERSONALIZED, AUTOMATED RECEPTIONIST

FIELD OF THE INVENTION

Embodiments of the invention generally relate to information technology, and, more particularly, to techniques for providing a personalized, automated receptionist in a work environment.

BACKGROUND

A receptionist is an employee of an organization that typically greets visitors, responds to visitor inquiries, answers telephone calls, performs an access control function and helps to direct visitors to their desired destination within the organization. A number of techniques have been proposed or suggested for automating one or more of the functions that have traditionally been performed by a live receptionist. For example, an automated attendant (often referred to as a virtual receptionist) allows callers to be automatically transferred to a telephone extension without interacting with a live operator or receptionist. Many automated attendant systems provide a menu system where callers can press an indicated number to reach a desired destination, such as a sales department or a service department.

Nonetheless, a need remains for a system that allows an individual, referred to herein as a host user, in a working environment, such as an individual office or a cubicle, to have a personalized, automated receptionist. For example, the automated receptionist can assist a visitor even when the host user is not present and can provide one or more of the functions that are typically performed by a live receptionist.

SUMMARY

In one aspect of the present invention, techniques for a personalized, automated receptionist are provided. An exemplary computer-implemented method for providing an automated receptionist for a host user can include steps of obtaining one or more images of a work environment of the host user; processing the one or more images to determine if at least one visitor is present in the work environment; and if the at least one visitor is determined to be present in the work environment, notifying the host user that the at least one visitor is present in the work environment, wherein at least one of the steps are performed by at least one hardware device. The method may be initiated, for example, when the host user is not present in the work environment.

During an exemplary training phase, an association can be obtained of one or more faces in the one or more images and one or more names of the at least one visitor. In addition, the automated receptionist can optionally learn one or more commands from the host user.

In further variations, the automated receptionist can optionally be configured to (i) provide a greeting to the at least one visitor, for example, including a name of the at least one visitor; (ii) enable communication between the at least one visitor and the host user; and/or (iii) provide one or more information items to the at least one visitor when the host user is not in the work environment.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Aspects of the present invention provide methods, apparatus and computer program products that allow a host user in a working environment to have a personalized, automated receptionist. As used herein, the term "host user" refers to the worker for whom the automated receptionist is to be employed. The automated receptionist can assist a visitor even when the host user is not present and can provide one or more of the services that are normally associated with a live receptionist, such as greeting visitors, responding to visitor inquiries, answering telephone calls, performing an access control function and otherwise assisting visitors.

In this manner, if the host user briefly steps out of his or her office, a potential visitor will not leave because the host user is not in his or her office. In one exemplary implementation, the automated receptionist can notify the visitor that the host user has stepped out for a moment but will be returning shortly and can notify the host user that a visitor has arrived (as well as potentially notifying the host user of the identity of the visitor). If the host user has stepped out to attend a meeting, the automated receptionist can check the calendar of the host user, let the visitor know that the host user is in a meeting and also indicate when the meeting is expected to end. In further variations, the automated receptionist can also optionally provide information to the visitor and/or share a document or other information that the host user is working on with the visitor.

Moreover, the automated receptionist can provide an audio and/or video channel between the host user and the visitor. For example, the host user can talk to the automated receptionist over an audio or video channel, initiated, for example, via the smart phone of the host user and anything communicated by the host user can be relayed to the visitor, and conversely by virtue of there being an open two-way channel. In this way, the automated receptionist with built-in speakers and microphone can act like a just-in-time speakerphone to communicate with the visitor (or not, at the discretion of the host user).

Figure 1:
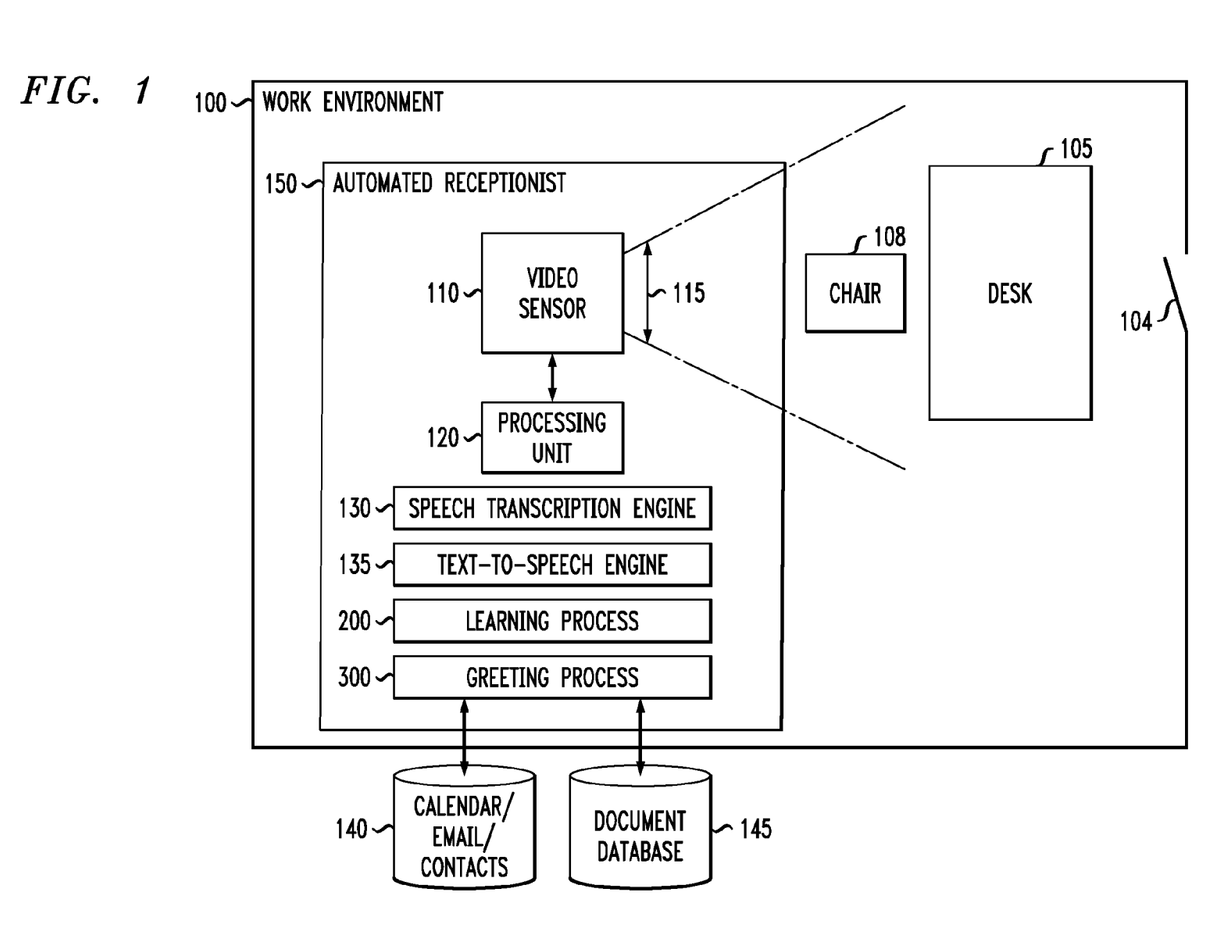
FIG. 1 illustrates an exemplary work environment in which the disclosed automated receptionist may be implemented.

FIG. 1 illustrates an exemplary work environment 100, such as an office or cubicle, in which the automated receptionist 150 may be implemented. As shown in FIG. 1, the exemplary automated receptionist 150 comprises a video sensor 110, such as a camera, web camera, or a three-dimensional (3D) sensing platform, such as the PrimeSense™ sensing platform, positioned in the work environment 100, and a processing unit 120. The exemplary video sensor 110 has a field-of-view 115. The exemplary work environment 100 may comprise a small office and the host user may be seated at a desk 105 in an office chair 108 directly in front of the video sensor 110. The video sensor 110 and chair 108 may face out to a doorway 104 (or other entranceway) in which visitors may enter the office.

As discussed further below in conjunction with FIG. 4, the exemplary processing unit 120 comprises a processor coupled to a memory. The processor may comprise a microprocessor, a microcontroller, an ASIC, an FPGA or other type of processing circuitry, as well as portions or combinations of such circuitry elements, and the memory, which may be viewed as an example of a "computer program product" having executable computer program code embodied therein, may comprise RAM, ROM or other types of memory, in any combination. Also optionally included in the processing unit 120 is network interface circuitry, which is used to interface the processing device with a network and other system components, and may comprise conventional transceivers.

The video sensor 110 can be positioned, for example, on a stand behind the desk 105 with a view 115 of the exemplary work environment 100. As discussed hereinafter, the exemplary automated receptionist 150 can employ a learning process 200, as discussed further below in conjunction with FIG. 2, to learn different visitors over time and when particular visitors come to the exemplary work environment 100. In addition, the exemplary work environment 100 performs a greeting process 300, as discussed further below in conjunction with FIG. 3, to greet one or more visitors. In addition, the exemplary work environment 100 can optionally process one or more predefined verbal commands from the host user using a speech transcription engine 130, such as "I will be back in 5 minutes" or "John Smith may stop by while I am away." In addition, the exemplary work environment 100 can process one or more of a calendar, email and contacts 140 of the user and/or a document database 145 of the host user. Finally, the automated receptionist can respond back with little tidbits of information, such as "[the host user's name] is expected back in 5 minutes" or "Hello Mr. Smith, [the host user's name] was expecting you" using a text-to-speech engine 135.

Figure 2:
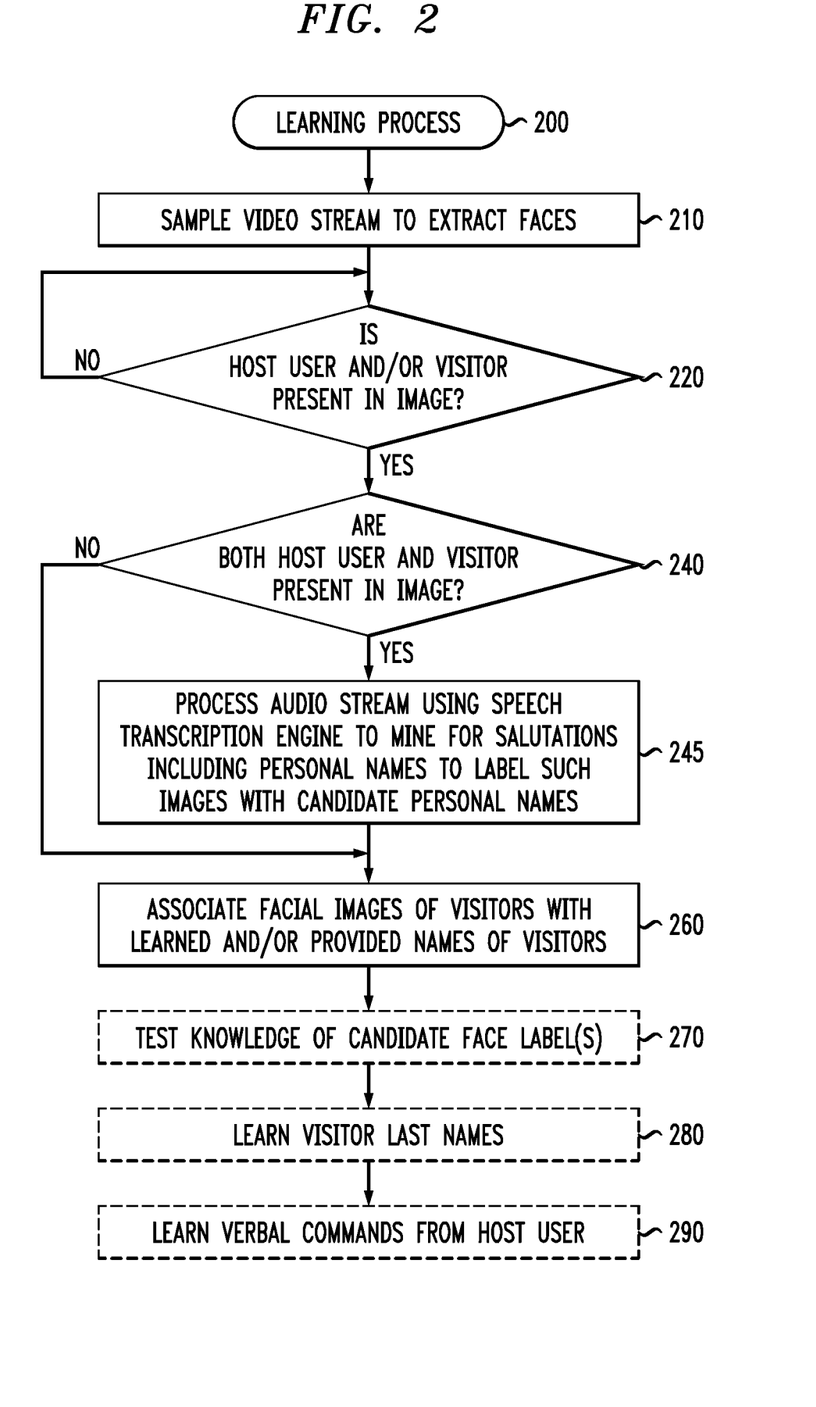
FIG. 2 is a flow chart illustrating an exemplary implementation of a learning process incorporating aspects of the present invention.

FIG. 2 is a flow chart illustrating an exemplary implementation of a learning process 200 incorporating aspects of the present invention. As shown in FIG. 2, the exemplary learning process 200 initially samples the video stream during step 210 to extract one or more faces, such as faces of visitors and/or faces of the host user. The video stream may be sampled, for example, at a rate of approximately one frame per second and speech-to-text transcription of the audio stream may be performed continuously. Faces can be extracted from the image, for example, using known methods of machine vision for face extraction.

A test is performed during step 220 to determine if the host user and/or a visitor is present in the image, for example, using patterned infrared sensing techniques that provide point cloud/depth of field information, in conjunction with standard machine vision methods to try to recognize heads, shoulders, or other salient body features. When the host user is present, for example, the image of the exemplary work environment 100 will typically have many more close points than when the host user is not present. The values associated with "close" and "many more points," can be learned over time using standard machine learning techniques, as would be apparent to a person of ordinary skill in the art.

A further test is performed during step 240 to determine if both the host user and a visitor are present. If it is determined during step 240 that both the host user and a visitor are present, a conversation can be assumed and a predefined duration (e.g., the first 10-15 seconds) of the audio signal is processed during step 245 to mine for salutations including personal names to label such images with candidate personal names for the visitor and/or the host user. Over time, using machine learning methods and/or feedback from the host user, the names of the host user and visitors can be learned. The universe of salutations will generally have many instances of these names. Of course, both the host user and visitor can have the same name and such circumstances can be learned (e.g., there might be two instances of "Hi Bob" in the captured introductory salutations).

Visitor face recognition is performed during step 260, using standard methods. Over subsequent visits, facial images of visitors can be associated with learned names of the visitors during step 260, for example, using machine learning techniques. In a further variation, the host user or another user can provide the names of recognized faces during step 260. It is noted that several instances of the same person may be recognized (for example, due to various "looks," such as various hair lengths, and either having or not having facial hair). Thus, a single name can map to multiple "looks" of the same person. In one exemplary implementation, each look for the same person is placed in the same bucket or equivalence class, indicating that a match on any of the looks would indicate the presence of the known individual.

When a given confidence threshold is exceeded, the knowledge of the face label is optionally tested during step 270, for example, by testing the candidate face label when both the visitor and host user are present (e.g., try "Hi Bob" when Bob is thought to be present). The testing performed during step 270 can optionally be performed with user feedback.

One or more facial images and a first name are optionally correlated during step 280 with the host user's calendar, email and/or contacts to learn the last names of visitors (optionally employing user feedback as in step 270).

Finally, predefined verbal commands from the host user are optionally learned during step 290, such as "I will be back in 5 minutes" or "John Smith may stop by while I am away." These commands can be supplied as a series of templates, in the first case, the statement "I will be back in 5 minutes" may be an example from the template "I will be back in X minutes" that can then be used to provide subsequent visitors with information about when to expect the host user's return. If a visitor comes by 10 minutes after the host user issued the command "I will be back in X minutes" then the automated receptionist knows that a viable greeting for the visitor may be to indicate that the host user is scheduled to retun return in X-10 minutes (assuming X >10). Analogously, the command "John Smith may stop by while I am away" may be an example from a template of the form "XXX may stop by while I am away" that enables the system to look for someone that may be named "John Smith" and greet them accordingly.

Figure 3:
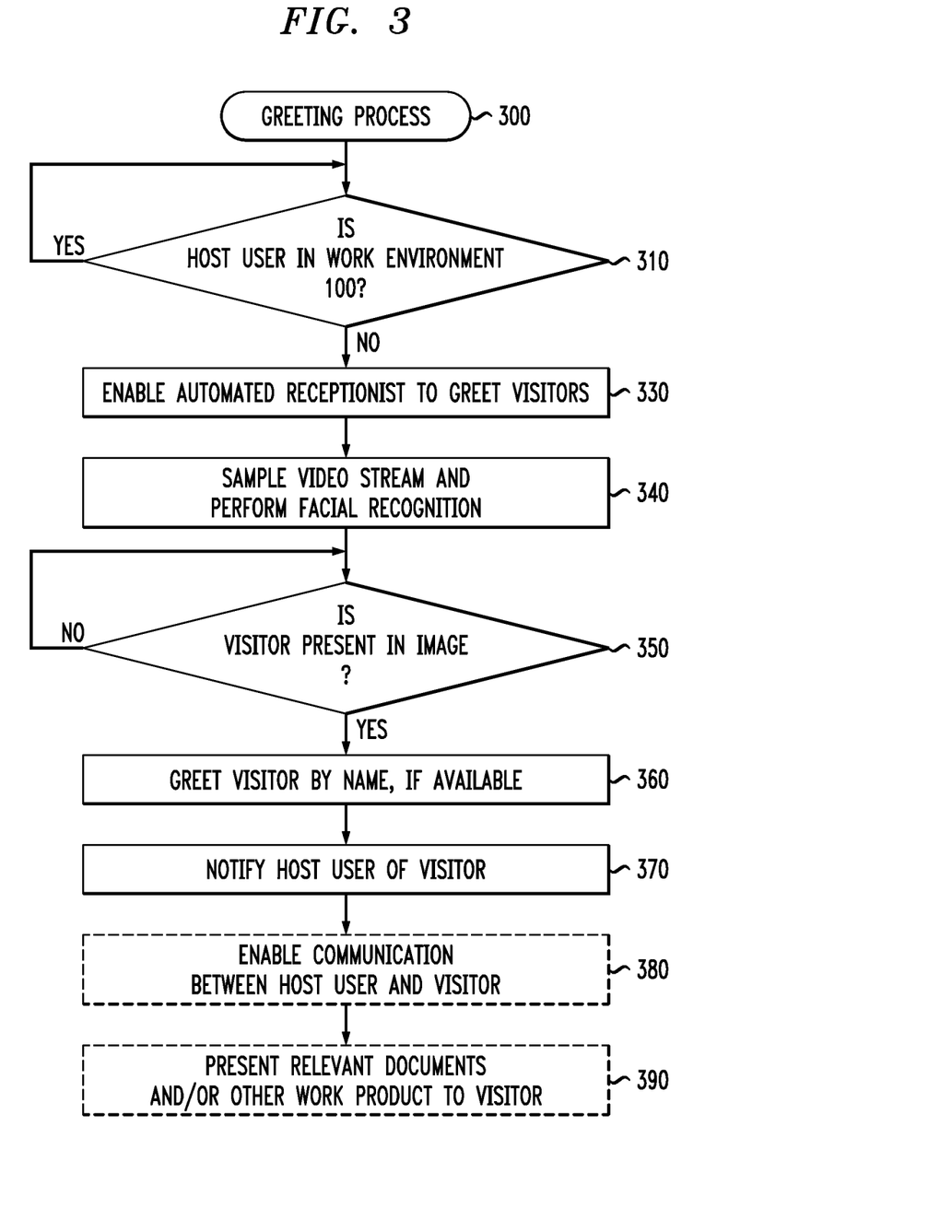
FIG. 3 is a flow chart illustrating an exemplary implementation of a greeting process incorporating aspects of the present invention.

FIG. 3 is a flow chart illustrating an exemplary implementation of a greeting process 300 incorporating aspects of the present invention. As shown in FIG. 3, the exemplary greeting process 300 initially performs a test during step 320 to determine if the host user is in the exemplary work environment 100. If it is determined during step 320 that the host user is in the exemplary work environment 100, then program control continues to monitor the exemplary work environment 100 until the host user leaves. If, however, it is determined during step 320 that the host user is not in the exemplary work environment 100, then the automated receptionist 150 is automatically enabled during step 330 to greet visitors based on facial recognition.

The exemplary greeting process 300 samples the video stream during step 340 and performs facial recognition using the features learned by the learning process 200 to recognize one or more faces, such as faces of visitors. A test is performed during step 350 to determine if a visitor is present in the image, for example, using patterned infrared sensing techniques that provide point cloud/depth of field information. If a visitor is detected in the image during step 350, the greeting process 300 can also determine if the visitor is known during step 350 (i.e., if the name of the recognized face has been learned by the learning process 200).

The visitor is greeted during step 360, by name, if the name is available. The host user is notified of the visitor during step 370, and images can optionally be presented to the host user of the visitor (especially when the visitor is not known). The candidate name of the visitor is optionally presented to the host user for validation during step 370 and/or the host user can be queried for the name of the visitor.

The exemplary greeting process 300 optionally enables communication between the host user and the visitor during step 380 (e.g., cellular, video chat, or any other voice and/or video communication). The exemplary greeting process 300 optionally presents one or more documents or other work product to the visitor that the visitor and host user have worked on during step 390 (optionally with appropriate access controls evaluated by the automated receptionist 150, such as an authentication or approval authorization from the host user).

In this manner, aspects of the present invention provide an automated receptionist 150 that avoids a potential visitor from stopping by an office and then leaving because the host user has stepped away briefly. In various embodiments, the host user can activate the automated receptionist 150 before leaving the office and then when a visitor stops by, the automated receptionist 150 can notify the visitor that the host user has stepped out briefly but will be returning. In addition, the automated receptionist 150 can optionally provide additional greetings and/or information to the visitor, such as a shared work product that the host user has been working on. At the same time, the automated receptionist 150 can notify the host user that the visitor has arrived (and potentially identifying the visitor). The automated receptionist 150 can also optionally enable communications between the absent host user and the visitor, until the host user returns to the office. Additionally, the automated receptionist can provide a simple means for a visitor who may be unknown to the host user to leave a message for the host user, analogous to a voice recording on a standard phone but with the additional value of providing visual information about the visitor.

The techniques depicted in FIGS. 2 and 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 2 and 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/o devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

Figure 4:
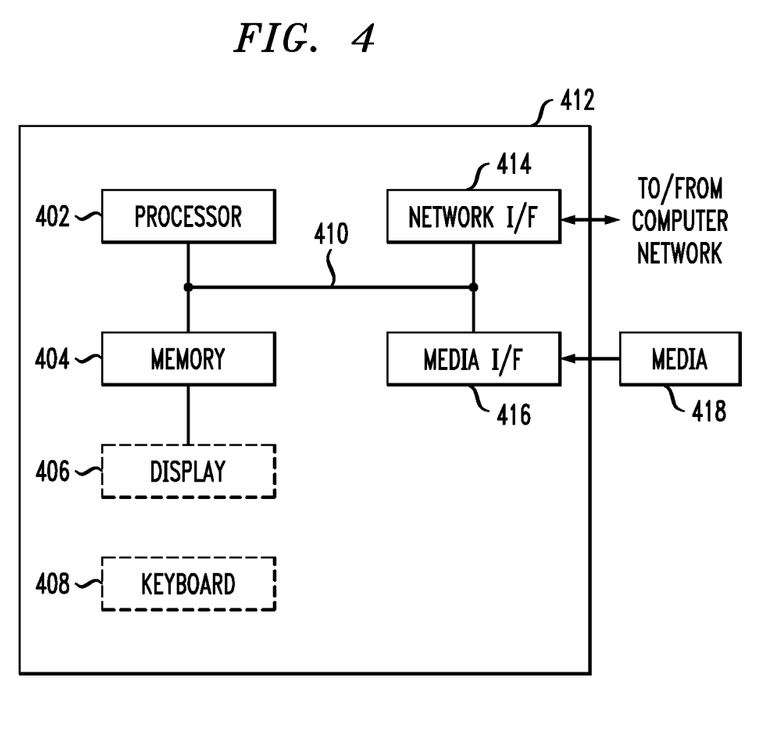
FIG. 4 is a system diagram of an exemplary computer system on which at least one embodiment of the invention can be implemented.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, controlling the activities of a system administrator or another user on an endpoint device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for providing an automated receptionist for a host user, the computer program product comprising a computer readable storage medium having program instructions embodied therewith, the program instructions executable by a computing device to cause the computing device to perform the following steps:
   performing a learning process comprising:
   obtaining one or more images of a work environment of said host user;
   processing, using at least one hardware device, said one or more images to determine if one or more of at least one visitor and said host user are present in said work environment, wherein said processing comprises:
   learning, using at least one hardware device, a name of said at least one visitor, wherein said learning comprises processing one or more items of speech of one or more of said at least one visitor and said host user;
   associating, using at least one hardware device, one or more faces in said one or more images of said at least one visitor with one or more of said learned names of said at least one visitor; and
   if said visitor is determined to be present in said work environment, notifying said host user that said visitor is present in said work environment.

2. A system for providing an automated receptionist for a host user, said system comprising:
   a memory; and
   at least one hardware device coupled to the memory and configured for:
   performing a learning process comprising:
   obtaining one or more images of a work environment of said host user;
   processing, using at least one hardware device, said one or more images to determine if one or more of at least one visitor and said host user are present in said work environment, wherein said processing comprises:
   learning, using at least one hardware device, a name of said at least one visitor, wherein said learning comprises processing one or more items of speech of one or more of said at least one visitor and said host user;
   associating, using at least one hardware device, one or more faces in said one or more images of said at least one visitor with one or more of said learned names of said at least one visitor; and if said visitor is determined to be present in said work environment, notifying said host user that said visitor is present in said work environment.

3. The system of claim 2, wherein said at least one hardware device is further configured for learning one or more commands for said automated receptionist from said host user.

4. The system of claim 2, wherein said at least one hardware device is further configured for initiating said method when said host user is not in said work environment.

5. The system of claim 2, wherein said at least one hardware device is further configured for providing a greeting to said at least one visitor.

6. The system of claim 5, wherein said greeting includes said learned name of said at least one visitor.

7. The system of claim 2, wherein said at least one hardware device is further configured for enabling communication between said at least one visitor and said host user, wherein said host user is not in said work environment.

8. The system of claim 2, wherein said at least one hardware device is further configured for providing one or more information items to said at least one visitor when said host user is not in said work environment.

9. The system of claim 8, wherein said one or more information items are provided to said at least one visitor following a determination that said at least one visitor has authorization for accessing said one or more information items.

10. The system of claim 2, wherein said said step of notifying said host user that said at least one visitor is present in said work environment further comprises a notification of an identity of said at least one visitor.

11. The system of 2, wherein said at least one hardware device is further configured to evaluate at least one of said obtained associations of said one or more faces and said one or more names of said at least one visitor.

12. The system of claim 2, wherein said step of associating said one or more faces in said one or more images of said at least one visitor further comprises employing provided names of said at least one visitor.

13. The system of claim 2, wherein one or more faces in said one or more images of said at least one visitor are correlated with one or more of calendar, email and contacts of said host user.

14. The system of claim 2, wherein said at least one hardware device is further configured to provide audio and visual information to the host user if the said at least one visitor is unknown to the host user.

* * * * *